Figure 1:
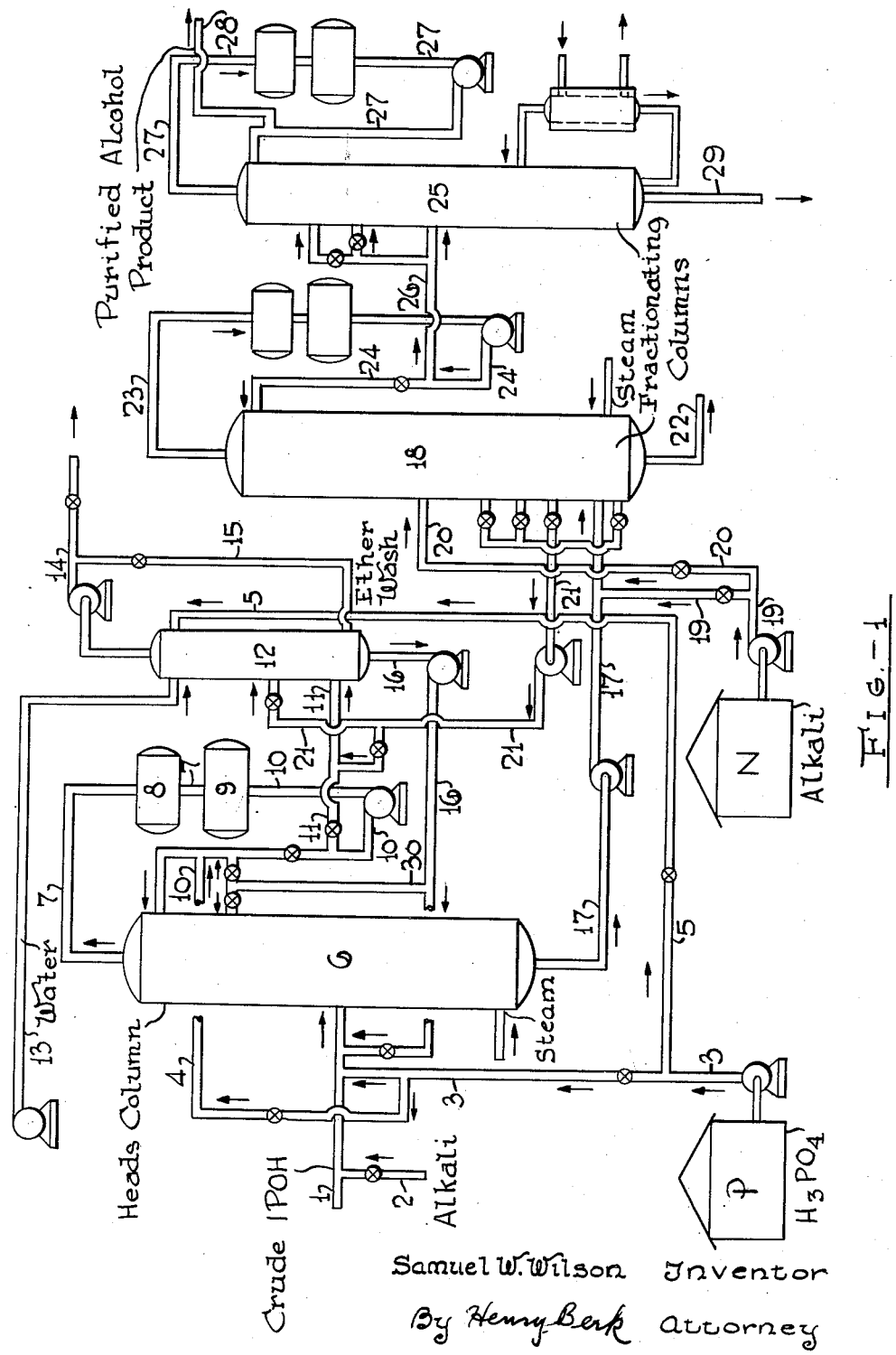

Dec. 7, 1954 S. W. WILSON 2,696,508
ISOPROPANOL QUALITY IMPROVEMENT PROCESS
Filed Sept. 21, 1950 3 Sheets-Sheet 3

Samuel W. Wilson Inventor
By Henry Berk Attorney

United States Patent Office 2,696,508
Patented Dec. 7, 1954

2,696,508

ISOPROPANOL QUALITY IMPROVEMENT PROCESS

Samuel W. Wilson, Baton Rouge, La., assignor to Standard Oil Development Company, a corporation of Delaware Application September 21, 1950, Serial No. 185,915

1 Claim. (Cl. 260—643)

This invention relates to a process for improving the quality of isopropanol. Particularly the process involves the processing of crude isopropanol prepared from propylene by sulfuric acid-catalyzed hydrolysis by (1) alkalizing the crude alcohol to destroy sulfuric acid and sulfur compounds, (2) reacidifying the crude alcohol with phosphoric acid, and (3) thereafter recovering the alcohol from the reacidified crude.

It is an object of this invention to set forth a process for the purification of crude isopropanol.

It is another object of this invention to set forth a process for the production of prime grade isopropanol free of malodorous impurities.

It is well known that alcohols, particularly those produced by the acid-catalyzed hydration of olefin hydrocarbons, possess a distinct and apparently foreign odor, slightly penetrating and for the most part disagreeable. While no attempt will be made to definitely assign the disagreeable odor of alcohols prepared by olefin hydration to the presence of any one or combination of chemical compounds, it can be said with reasonable assurance that the odor of crude alcohol depends to a large extent on the quality of the olefin stream employed in the olefin hydration operation. Likewise, the odor of a refined alcohol depends to a large extent on the quality of the crude alcohol from which it is prepared.

Olefin hydrocarbons, such as those produced by the cracking of mineral oils, contain variable amounts of compounds having an obnoxious odor particularly sulfur compounds such as hydrogen sulfide, alkyl sulfides and mercaptans. These materials present, even in minute amounts, in the olefin stream to the sulfuric acid-catalyzed hydration process are believed to contribute to the obnoxious odor of the crude alcohol since, while sulfur alone has no smell, it is clear that in combination with other elements it is a powerful odoriferous agent. The bad odor of alcohols has also been attributed to the presence of so-called high-boiling polymer products formed in side reactions during the alcohol process. The odor of the polymer products is strengthened by the presence of any sulfur compounds dissolved therein, although the odor of some of the pure polymers themselves is by no means pleasing to the olfactory sense. A typical analysis of a sample of the so-called polymer product, in this case the so-called propyl oil, resulting from the production of isopropyl alcohol by the sulfuric acid-catalyzed hydration of propylene, is as follows:

55 wt. per cent sec-heptanol (B. P. 137–140° C.)
21 wt. per cent sec-octanol (B. P. 160–165° C.)
2 wt. per cent $C_7$ ketone (B. P. 131° C.)
13 wt. per cent hydrocarbons (B. P. above 180° C.)
9 wt. per cent ethers (B. P. above 160° C.)
Traces of sulfur compounds The composition of the propyl oil or so-called high-boiling polymers obtained during the concentration of dilute crude isopropanol varies according to the point from which the alcohol containing it is withdrawn in the concentrating tower, and the odor likewise varies. Cuts can be identified with an odor of camphor, of menthol, etc. It has also been reported that the presence of nitrogen compounds also contributes to the odor of alcohols.

The odor imparted to isopropyl alcohol by the propyl oil impurities is a hydrocarbon type odor. This type of odor has been found to be effectively removed by a number of methods such as by careful and repeated conventional fractionations, but particularly by the water extractive distillation method as described and claimed in U. S. patent application Serial Number 24,626 filed May 1, 1948, now Patent No. 2,638,440, and assigned to applicant's assignee. However, there is a second type of odor which is fugitive in nature and which may best be characterized as a mercaptan or thioaldehyde odor, and which is attributed to the presence of low-boiling sulfur compounds such as mercaptans or thioaldehydes which appear to be decomposition products of higher-boiling impurities which break up under alcohol purification-distillation conditions. It has been found that this second type of odor is particularly noticeable when the alcohol production process is operated under upset regenerator conditions or when the purification process is operated under upset concentrator conditions. When the capacity of the regenerator or concentrator is exceeded some isopropyl alcohol creeps down into the reboiler associated with the regenerator or concentrator wherein a high temperature prevails and where a particular concentration of sulfuric acid exists. Under these conditions it is felt that the sulfuric acid present in the reboiler acts as a reducing agent on the isopropyl alcohol which decomposes into lower-boiling impurities, particularly mercaptan and/or thioaldehyde compounds which are volatile. These impurities go overhead with the alcohol from the regenerator. Subsequently in the concentrator they are not all removed with the low-boiling overhead, but remain in traces of parts per million in the isopropyl alcohol product which is removed as a top sidestream from the concentrator. Likewise if the concentrator conditions are upset the same decomposition occurs and the problem becomes aggravated. It has also be theorized that the second type of odor is due to the decomposition of sulfurized esters which are formed in minute amounts during the propylene absorption in sulfuric acid. These esters are thought to decompose either thermally or by hydrolysis.

Furthermore, there are indications that some of the malodorous compounds are rather strongly bound in the aqueous alcohol product in such a manner that they tend to concentrate along with the alcohol during such alcohol finishing operations as solvent extraction heads removal, water extractive distillation, and concentration. However, the nature of the chemical reactions tending to bind these malodorous compounds is such that unstable addition compounds result and the malodorous compounds are liberated and volatilized to some extent during all alcohol finishing operations of the types described. For instance, in typical alcohol finishing operations the following problems are encountered. Crude alcohol, after passing through the heads operation to remove ether and other low boilers, is fed to a finishing column in which certain low-boiling materials are taken overhead with a purified alcohol taken as a sidestream. Materials contributing to recycle odor appear to be lower boiling than the alcohol proper but are nevertheless not completely removed from the alcohol sidestream. This result is believed to be due in large part to the fact that decomposition reactions liberating low boiling malodorous compounds occur during the distillation, allowing these malodorous compounds to pass overhead. Similar difficulties are encountered when applying water extractive distillation to the same crude alcohol. In fact, water extractive distillation appears to concentrate the compounds giving rise to mercaptan odor along with the alcohol so that, in the final alcohol finishing operation, an alcohol product high in mercaptan odor is obtained. This seems to be particularly true of isopropyl alcohol prepared by the so-called weak acid method as described below.

It has now been found that isopropanol of improved odor quality can be produced by treating the crude alcohol with an alkalizing agent such as the alkali or alkaline earth oxides, hydroxides or carbonates, organic amines, etc. until a pH of above 8.0, preferably 10 to 11, is obtained, reacidifying the alkaline crude with phosphoric acid or $P_2O_5$ to a pH of 2.0 to 6.9, preferably 5 to 6.5, and thereafter recovering the alcohol from the reacidified solution. If the original crude alcohol is acidic it must be treated with an alkalizing agent until its pH exceeds 8.0. If it is neutral it still must be brought up to the required alkaline pH. If these prerequisite conditions are not satisfied treatment with phosphoric acid has less effect. Treatment with sulfuric acid and/or sulfurous acid instead of phosphoric acid does not improve the quality of the recovered alcohol.

After the crude aqueous isopropanol has been acidified with phosphoric acid the alcohol is recovered by any of a number of alternative methods such as by solvent extraction of the alcohol with solvents insoluble in aqueous alcohol, e. g. aliphatic ethers, by conventional fractional distillation methods involving customary heads removal followed by concentration, by stripping, or by water extractive distillation, etc.

Crude isopropyl alcohol may be produced by the sulfuric acid-catalyzed hydration of propylene by the weak acid method or the strong acid method. In the former process a relatively rich propylene stream containing about 50–80 volume per cent propylene is absorbed in sulfuric acid of approximately 60 to 80 weight per cent concentrations, preferably 70 weight per cent at about 170° F. and approximately 250 p. s. i. g. pressure to form an extract comprising isopropyl sulfate which is partially hydrolyzed to alcohol during the absorption. The hydrolysis is completed by dilution of the extract with water to approximately 45 wt. per cent acid strength, with or without a soaking period which entails maintaining the extract at a temperature of about 190° F. for a period of about 10 minutes residence time. The hydrolysis products are then distilled in an alcohol regenerator wherein crude alcohol vapors are removed overhead and condensed, and wherein spent sulfuric acid is recovered as bottoms for reconcentration and subsequent re-use in the absorption process. The crude isopropyl alcohol contains approximately 30–60% by volume of isopropyl alcohol, some impurities including hydrocarbons, isopropyl ether, acetone and unknown impurities, and the balance water. The crude alcohol is condensed and cooled and is ready for the purification stage of the process.

In the strong acid process a propylene stream of relatively lower propylene content, i. e. about 30–60 volume per cent propylene is contacted under similar conditions with a stronger sulfuric acid, e. g. acid of 80–95 weight per cent concentration, preferably 85–88 weight per cent, whereby an extract is formed as above. The extract goes through a similar hydrolysis and stripping treatment to produce a crude isopropyl alcohol as described for the weak acid process.

When the isopropyl alcohol is purified by conventional fractionation it is led to a heads column purpose of which is to remove ether and other low-boiling water-insoluble impurities, such as hydrocarbons, hydrocarbon polymers, oxygenated compounds, and unknown impurities. This is accomplished by a steam stripping operation whereby the lighter materials are withdrawn overhead while weak aqueous alcohol is recovered as bottoms. The weak aqueous alcohol is then distilled in a concentrating column where the alcohol is concentrated to a composition approaching its water azeotrope, viz., 91 vol. per cent isopropyl alcohol–9 vol. per cent water. The alcohol of azeotropic composition may be further distilled for removal of acetone, if present, or concentrated further to 95 vol. per cent or 99 vol. per cent isopropyl alcohol if desired.

When the crude isopropyl alcohol is being purified by extractive distillation such as is described in Serial No. 24,626 referred to above, the crude alcohol is distilled countercurrent to an internal water reflux containing 70–99 mol. per cent water, preferably 80–95 mol. per cent, whereby the low boiling impurities both water-soluble and water-insoluble and some of the high-boiling impurities are removed overhead, while a dilute aqueous solution of the alcohol is recovered as bottoms and sent to a concentrating column where azeotropic alcohol is separated as a top sidestream from the balance of the high-boiling impurities and water.

The process may be better understood when read in conjunction with the accompanying drawings which represent diagrammatic elevational views of equipment and flow of materials in the processes.

Figure 2:
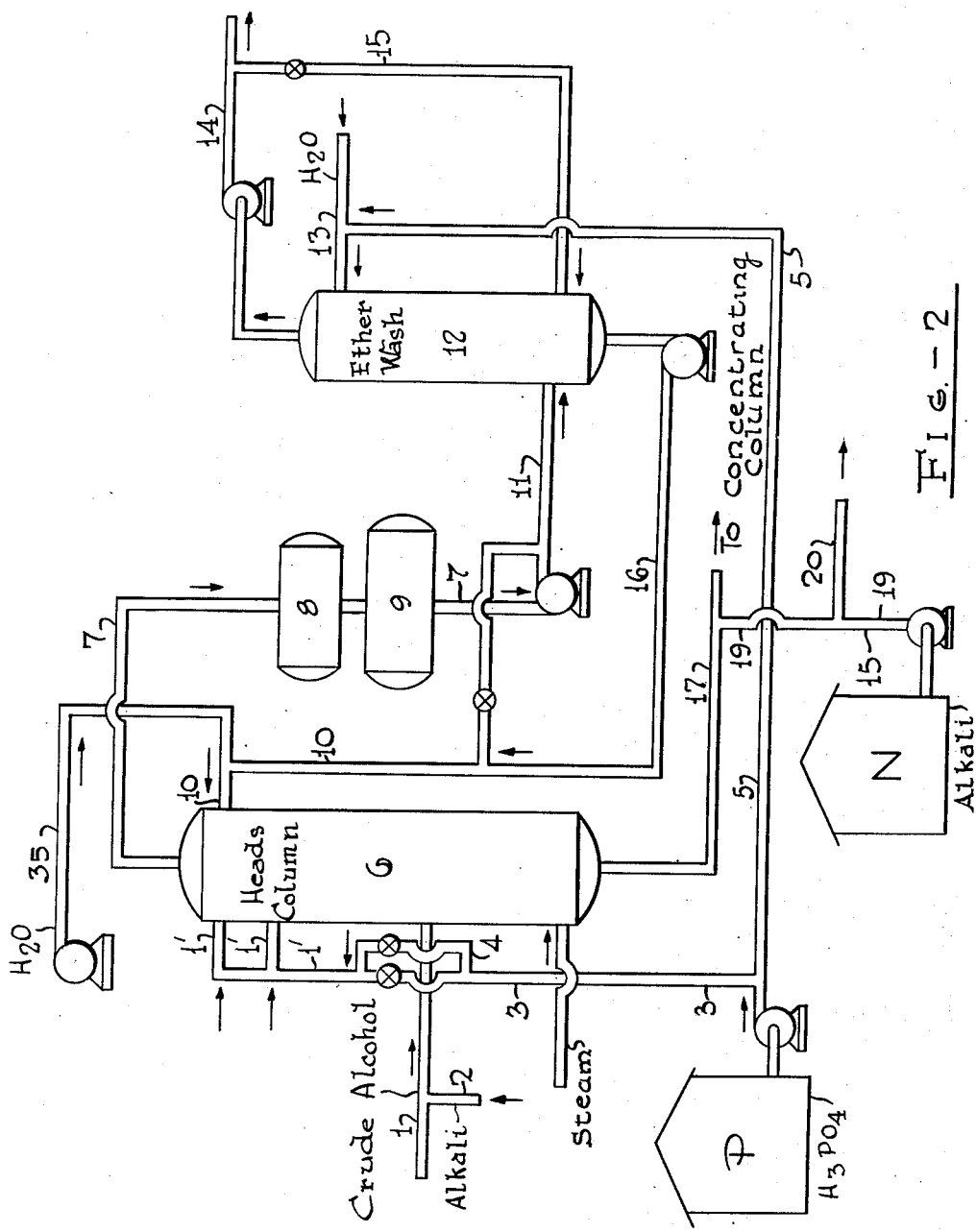

Figure 1 is a flow sheet of the process employing conventional distillation methods for isopropanol recovery. Figure 2 illustrates recovery process employing water extractive distillation, while Figure 3 illustrates the solvent extraction recovery method.

Referring to Figure 1, crude aqueous isopropanol is introduced to the heads column 6 through line 1. Caustic is preferably added through line 2 to adjust the pH of the alcohol to above 8.0. Phosphoric acid is introduced from tank P through lines 3, 4, or 5, or a combination of these lines to lower the pH of the contents of the heads column to 2.0 to 6.9, preferably 5.0 to 6.5. Ether and other light ends are distilled overhead from column 6 via line 7 through condenser 8 to accumulator 9. A portion of the overhead may be returned as reflux via line 10 to column 6 and the remainder or total stream, if no reflux is used, is pumped via line 11 to ether washer 12. Water is introduced via line 13 to dilute the overhead to washer 12 in sufficient amount to cause phase separation of ether and aqueous alcohol. Product ether is drawn off through line 14 and a portion may be recycled to washer 12 via line 15 to improve washing. The ether washer bottoms are returned to heads column 6 via line 16 or 30 at any one of several points in the tower. It may be returned via line 10. Open steam or a reboiler is used to introduce heat to the heads column. The bottom from the heads column is fed to the concentrating and fractionating column 18, through line 17. Preferably caustic is injected into the bottoms from the heads column from tank N through line 19 in sufficient amount to make the stream alkaline, preferably to a pH of 10.5. The caustic may be introduced via line 20 into the alcohol column at some point above the feed in sufficient amount to raise the pH of the liquid on the trays and the bottoms from the column above 8. High boilers are withdrawn from the bottom section of the alcohol column from zones above and/or below the feed point through line 21 and introduced into the ether washer 12 where in the presence of sufficient water, phase separation takes place and the high boilers are extracted with the ether. Either open steam or a reboiler may be used to supply heat to the alcohol column. Water is withdrawn from the bottom of the alcohol column via line 22. The 91% isopropanol azeotrope plus acetone and other low boiling water-soluble compounds, e. g. aldehyde, are taken overhead on column 18 through line 23 and condensed. A portion of the overhead is pumped back as reflux through line 24 and the balance is fed to the acetone column 25 through line 26. Acetone and other possible light ends are taken overhead from column 25 through line 27. A portion of the overhead is pumped back as reflux and the balance is sent to storage as a lower grade isopropanol or crude acetone through line 28. Product isopropanol is taken as bottoms through line 29. Heat is supplied to column 25 by means of a reboiler.

Referring now to Figure 2 the purification of isopropanol by water extractive distillation will be described. Crude aqueous isopropanol is fed to the heads column 6 through line 1. Caustic is added either in the crude section or through line 2 to make the pH above 8.0. Phosphoric acid sufficient to attain a pH of 2.0 to 6.9, preferably 5.0 to 6.5, is then added to the crude from tank P through line 3 or by-pass 4 via line 1 or 1'. Water as the extractive medium is introduced to the extractive or heads column via line 35 and 10. The overhead is taken via line 7, condensed in condenser 8, and pumped from accumulator 9 to the ether washer 12 via line 11. A portion may be returned as reflux through line 10. The bottoms from the ether wash is returned to the heads column via line 16 and 10. Water is added to the ether washer via line 13 and phosphoric acid may be injected at this point via lines 5 and 13. Ether product is withdrawn via line 14 and a portion may be returned via line 15 to the ether washer. The dilute aqueous isopropanol bottoms from the heads column passes through line 17 to the concentrating column (not shown). From this point on the finishing is identical with the process of Figure 1. Alkali, e. g. sodium hydroxide, is preferably added to the bottom from the heads column via line 19 from tank N or via line 20 to the concentrating column in sufficient quantity to make the stream alkaline, preferably to a pH about 10.5. The balance of the flow diagram is the same as shown in Figure 1.

Figure 3:
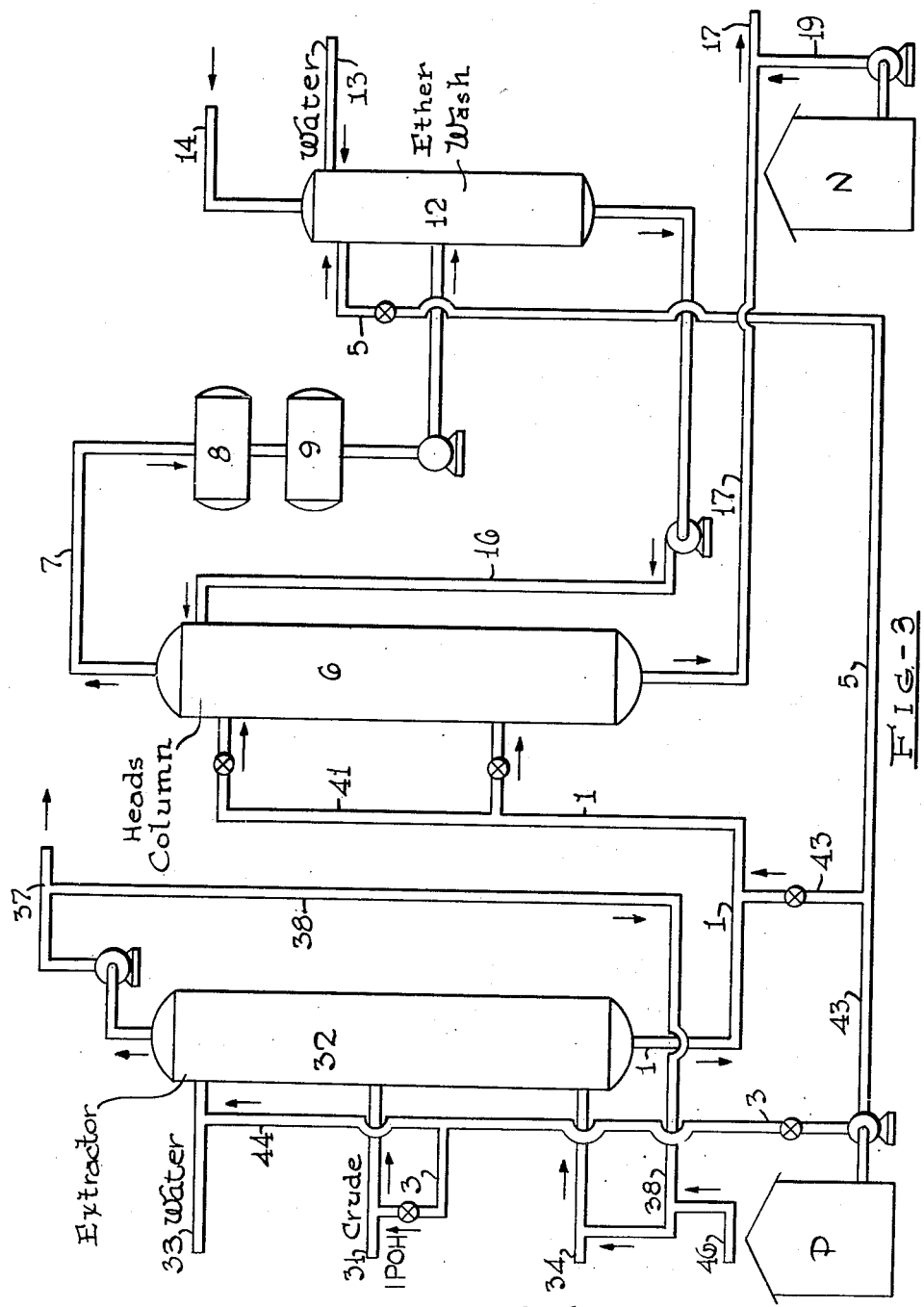

The liquid phase solvent extraction process for the recovery of isopropanol from the phosphoric acid-treated crude isopropanol is illustrated in the flow diagram of Figure 3.

Referring to Figure 3, the crude aqueous isopropanol enters a liquid phase countercurrent extraction vessel 32 via line 31. Water is added to extractor 32 via line 33 in sufficient quantity to give phase separation of ether and high boilers from the crude alcohol. A water-insoluble solvent such as isopropyl ether or hydrocarbon, e. g. pentane, is injected into the bottom of extractor 32 via line 34. Other contactors and settlers may be used. The dilute isopropanol from the countercurrent extractor is fed to the first column 6 (or heads column) via line 1 or 41. Phosphoric acid from tank P is added to the crude via line 3 or may be introduced via line 44 in sufficient amount to render the crude acid to the extent previously recited, preferably to a pH of 5.0 to 6.5. The alcohol from the crude section is made alkaline to a pH greater than 8.0 prior to acidification with phosphoric acid. The contents of extractor 32 should be acid and if necessary phosphoric acid may be added with the water via line 44 and line 33. The ether containing the extracted materials is withdrawn via line 37 and a portion recycled via line 38. Extraneous or redistilled solvent may be added via line 46. Light ends and low boiling dilute alcohol soluble materials or soluble materials of higher relative volatility than dilute aqueous isopropanol, <30% concentration, preferably 15%, are taken overhead from column 6. Phosphoric acid may be added to the heads column feed via line 43 or via line 5 and ether washer 12. The balance of the flow is the same as Figures 1 and 2 with alkali being added from tank N and line 19 to the feed to the concentrating column in line 17 to render the stream alkaline, preferably to a pH about 10.5, prior to concentration of the alcohol.

The invention is illustrated by the results of laboratory runs set forth in the following tables:

Commercial scale tests were also conducted and the results obtained in the laboratory tests were confirmed. The plant tests were made over a period of 3 to 8 hour distillation time. During these tests the products were rated as grade 1 in all instances while prior to and after the test period (phosphoric acid shut off) the isopropanol was graded as low as 4, which is the lowest possible grading. Typical data from the plant runs are given in Table III. During these operations the pH of the heads column bottoms separated with water extractive distillation conditions or semi-extractive conditions was lowered from a pH in the range of 8.7 to 11 to a range of 3.6 to 6.8 with phosphoric acid. The phosphoric acid was introduced to the system via the heads column reflux drum. Essentially all of the heads column overhead was pumped from the reflux drum to the ether washer and the ether washer bottoms (pH 2.8 to 3.6) were returned as reflux to the top of the heads column along with some hot process water. In these runs it is not found necessary to inject caustic into the bottoms from the heads column (feed to the alcohol concentration column). This is believed to be due to the fact that in the laboratory operation the distillation was batchwise and it was not possible to reject high boilers overhead during the heads operation or via side streams. There was no evidence of corrosion based on copper and iron analyses of the heads column bottoms and the ether washer bottoms streams.

TABLE I

*pH control and product quality of isopropanol*

| Run Number | X50A | X50C | X50D | X50E | X50F |
|---|---|---|---|---|---|
| Initial pH of Crude | 3.3 | 3.3 | 3.3 | 3.3 | 3.3. |
| Treatment of Crude | None | NaOH to 10.5 pH | {NaOH to 10.5 pH / $H_3PO_4$ to 5.0 pH} | $H_3PO_4$ to 5.0 pH | None. |
| Treatment of Bottoms from Heads Operation | None | None | NaOH to 10.5 pH | NaOH to 10.5 pH | NaOH to 10.5 pH. |
| Product Quality | 4 R and H | 3 B | 1½ | 3 B | 3 R. |
| Remarks | Finished in plant 3 H | | Slightly less than Grade 1. | | |

Product Quality:
 R = Recycle odor.
 H = Hydrocarbon odor.
 B = Butyl odor.
Grades 1 and 2 = Prime grade.
Grades 3 and 4 = Regular grade.

TABLE II

*pH control and product quality of isopropanol*

| Run Number | X60A | X60A (Check Run) | X60E | X60E (Check Run) | X60B | X60C | X60D |
|---|---|---|---|---|---|---|---|
| Initial pH of Crude | 8.6 | 8.6 | 8.6 | 8.6 | 8.6 | 8.6 | 8.6. |
| Treatment of Crude | 10.5 pH with NaOH then 5.0 pH with $H_3PO_4$ | 10.5 pH with NaOH then 5.0 pH with $H_3PO_4$ | 5.0 pH with $H_3PO_4$. | 5.0 pH with $H_3PO_4$. | None | None | 10.5 pH with $Na_3PO_4$. |
| Treatment of Bottoms from Heads Operation | 10.5 pH with NaOH | 10.5 pH with NaOH | 10.5 pH with NaOH | 10.5 pH with NaOH | ----do---- | 10.5 pH with $Na_3PO_4$ | None. |
| Product Quality | 1 | 1 | 3 R and B | 3 R and B | 3 B | 4 R | 4 R. |
| Remarks | Equivalent to heart cut from redistillation of Grade 1 alcohol. | Equivalent to heart cut from redistillation of Grade 1 alcohol. | | | This is the blank run. This crude finished 3 H in the plant. | | |

Product Quality
 R = Recycle odor.
 H = Hydrocarbon odor.
 B = Butyl odor.
Grades 1 and 2 = Prime grade.
Grades 3 and 4 = Regular grade.

TABLE III

*Effect of acidifying the heads column with phosphoric acid on isopropanol odor*

| Plant Run No. | Time | Odor of Product [1] | Remarks |
|---|---|---|---|
| 1 | 8:05 a. m. | 3 R and H | Phosphoric acid started at 8:10 a. m. Heads column bottoms less than 6.0 pH. Samples at ½ hr. intervals, all Grade 1. One-half hour after acid was cut off. Composite for period 8:45 a. m. 2:00 p. m., Grade 1. |
| | 8:45 a. m. | 2 H | |
| | 9:00 a. m. | 1 | |
| | 9:40 | 1 | |
| | 1:30 | 1 | |
| | 2:30 p. m. | 3 R and H | |
| 2 | 5:00 a. m. | 3 R and H | Phosphoric acid started at 8:05 a. m., pH 11.0 before start. pH 4.0 to 6.3 maintained during balance of run. Samples were taken at 20 to 30 minute intervals. 8:50 a. m.- 4:03 p. m. All Grade 1. Acid cut off at 3:42 p. m. |
| | 8:00 a. m. | 3 R and H | |
| | 8:15 a. m. | 2 H | |
| | 8:30 a. m. | 3 R and H | |
| | 8:50 | | |
| | 4:03 p. m. | 1 | |
| 3 | 11:50 a. m. | 4 R and H | Phosphoric acid started at 12:05 p. m. 8.7 pH on heads bottoms before starting acid. pH heads bottoms 3.6-6.0. Do. Do. Do. Do. |
| | 12:00 noon | 4 R and H | |
| | 12:40 p. m. | 3 R and H | |
| | 1:10 p. m. | 3 H | |
| | 1:30 p. m. | 1 | |
| | 1:40 p. m. | 1 | |
| | 2:10 p. m. | 1 | |
| | 2:40 p. m. | 1 | |
| | 3:10 p. m. | 1 | |

[1] R=Recycle odor; H=Hydrocarbon odor.

In grading isopropanol as reflected by the ratings in the tables, the following is the meaning of the numerical ratings:

Grade 1—Alcohol with no foregin odor.
Grade 2—Alcohol with a very slight foreign odor.
Grade 3—Alcohol with a moderately noticeable odor.
Grade 4—Alcohol containing appreciable to excessive amounts of foreign odor.

Having described the invention in a manner such that it may be practiced by those skilled in the art what is claimed is:

A process for refining crude aqueous isopropanol prepared by sulfuric acid catalyzed-hydration of propylene, said crude isopropanol being characterized by the presence of undesirable odors of sulfur compounds and hydrocarbon impurities, which comprises adding to said crude isopropanol sufficient alkali to give the crude alcohol a pH in the range of 8.7 to 11, then acidifying the alkaline crude isopropanol with phosphoric acid until the isopropanol has a pH of 5.0 to 6.5 prior to distillation of said crude isopropanol with alkali, then distilling the acidified crude isopropanol to remove therefrom impurities comprising low boiling and high boiling impurities, treating the acidified crude isopropanol residue from which said impurities are distilled until the isopropanol is rendered alkaline, and distilling refined isopropanol from the isopropanol residue rendered alkaline.

References Cited in the file of this patent

UNITED STATES PATENTS

| Number | Name | Date |
|---|---|---|
| 2,080,111 | Bump | May 11, 1937 |
| 2,541,673 | Smith | Feb. 13, 1951 |

FOREIGN PATENTS

| Number | Country | Date |
|---|---|---|
| 350,502 | Great Britain | June 15, 1931 |